United States Patent [19]

Okeley, II et al.

[11] 3,898,355
[45] Aug. 5, 1975

[54] METHOD FOR FORMING POLYMER COATINGS ON ARTICLES
[75] Inventors: Robert E. Okeley, II, Yorktown; Richard H. Cole, Jr., Muncie, both of Ind.
[73] Assignee: Ball Corporation, Muncie, Ind.
[22] Filed: Mar. 26, 1973
[21] Appl. No.: 344,675

[52] U.S. Cl.................... 427/314; 65/60; 215/12 R; 215/DIG. 6; 427/318; 427/430; 427/435; 428/442; 428/463; 428/522
[51] Int. Cl.²... C03C 17/00; B05D 3/00; B05D 1/18
[58] Field of Search........ 65/60, 116; 117/47 H, 54, 117/94, 113, 124 E, 161 UF

[56] References Cited
UNITED STATES PATENTS

| | | | |
|---|---|---|---|
| 2,515,489 | 7/1950 | Borushko | 117/113 |
| 2,728,686 | 12/1955 | Borushko | 117/113 |
| 2,812,269 | 11/1957 | Ransburg | 117/102 |
| 2,861,897 | 11/1958 | Hendrixson | 117/113 |
| 3,073,721 | 1/1963 | Pokorny | 117/105.1 |
| 3,339,526 | 9/1967 | Bradley | 117/113 |
| 3,598,269 | 8/1971 | Carmen | 117/124 E |
| 3,734,765 | 5/1973 | Russell | 117/113 |

OTHER PUBLICATIONS

Roff, Handbook of Common Polymers, p. 110, Published 1971.

Primary Examiner—William D. Martin
Assistant Examiner—William H. Schmidt
Attorney, Agent, or Firm—Gilbert E. Alberding

[57] ABSTRACT

A method for rapidly coating articles with a smooth, sag-free polymer coating or film by immersion of the article in a boiling bath of the polymer and a solvent for the polymer, while the article to be coated is at a temperature sufficiently higher than that of the bath to induce noticeable localized increased boiling as the article is immersed. The articles may be vitreous, metallic or mineral. Glassware retaining the heat from production may be coated.

2 Claims, 5 Drawing Figures

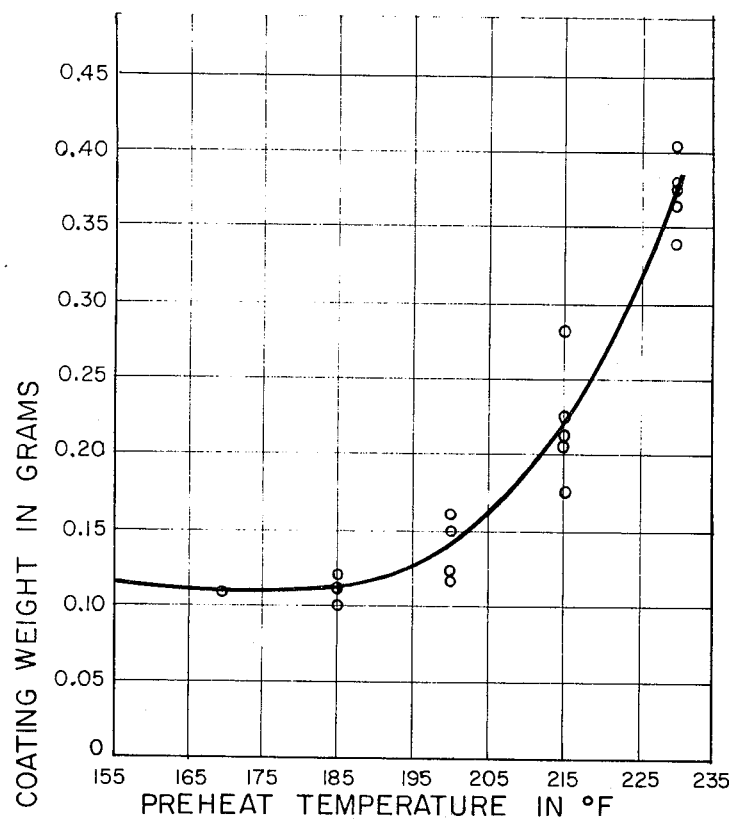
Fig_2
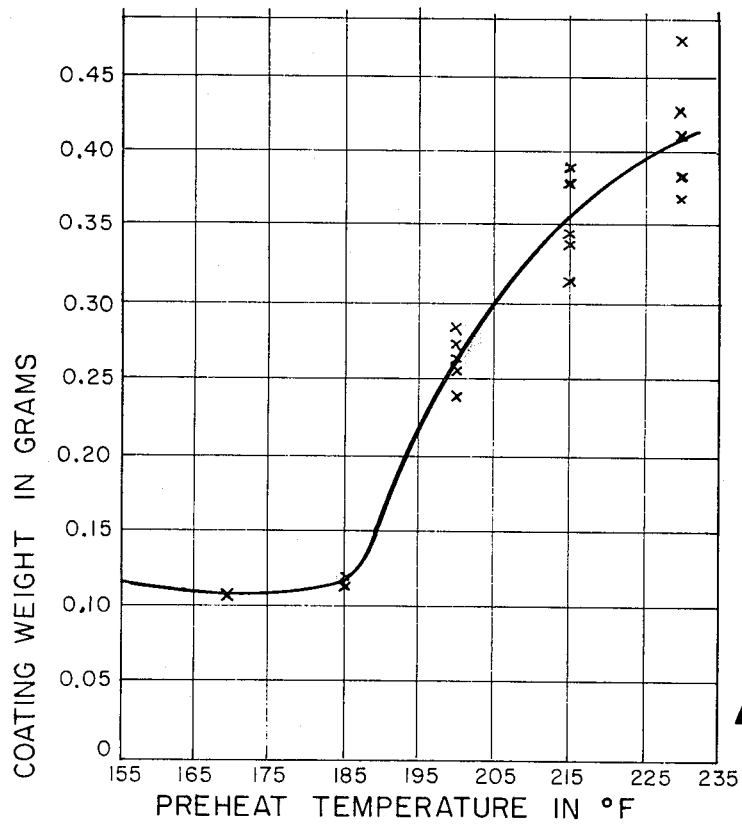
Fig_1

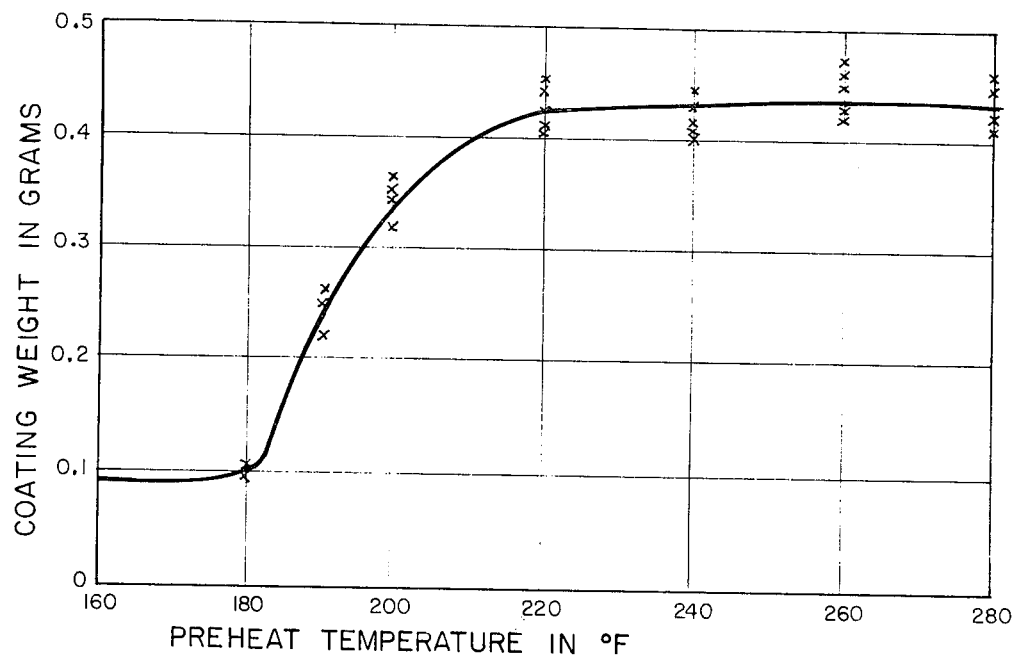
Fig_3
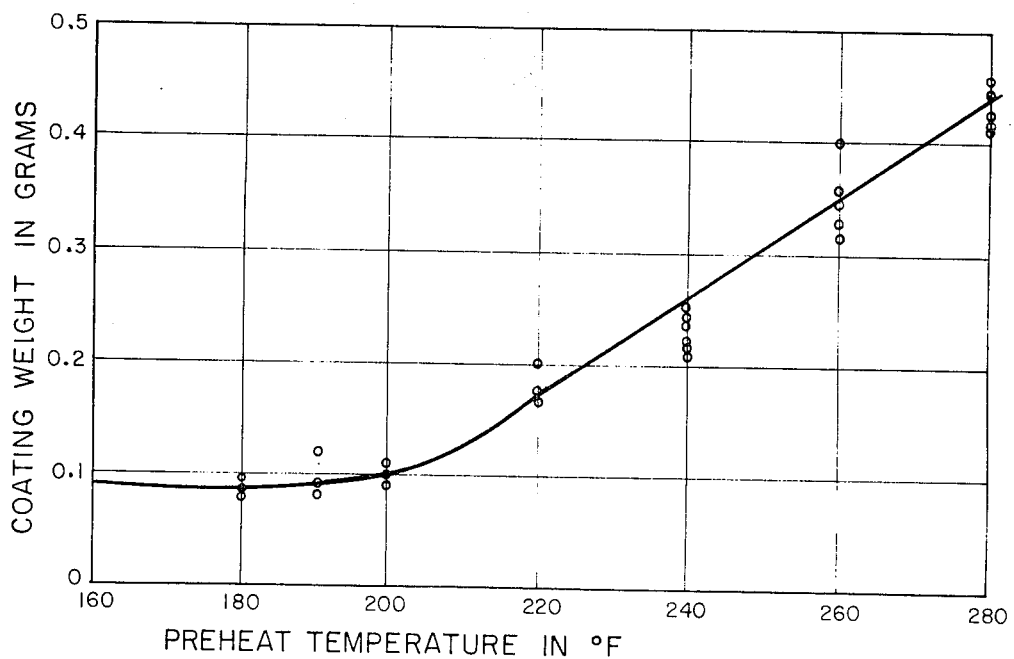
Fig_4

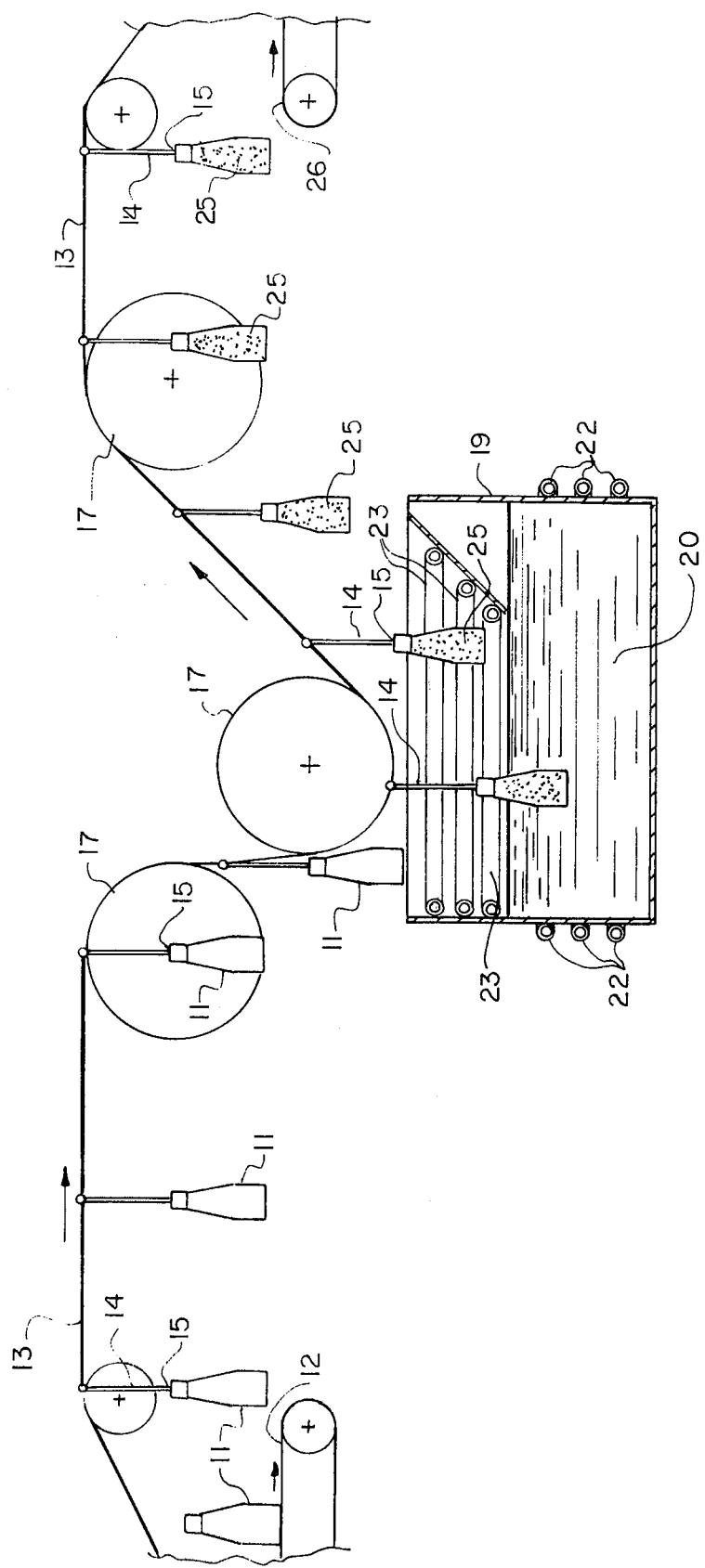
Fig_5

METHOD FOR FORMING POLYMER COATINGS ON ARTICLES

BACKGROUND OF THE INVENTION

1. Field of the Invention

The present invention relates generally to the coating of articles and more particularly to the coating of vitreous articles with polymer coatings by immersion or dipping of the heated article into a heated solution of the polymer and a solvent for the polymer.

2. Description of the Prior Art

The desirability of coating articles with polymers is well known. Spraying of polymers onto heated articles, immersion of heated articles into fluidized beds of the polymer, immersion of heated articles into plastisol baths, and immersion of heated articles into heated baths of the polymer in a solvent for the polymer are known in the prior art. A particularly demanding application, and one to which the instant invention is uniquely applicable, is the coating of glassware. It is, of course, well known that glassware, when stressed to failure, shatters and produces sharp particles. Accordingly, efforts have been made for some time to encapsule the glassware in a plastic coating capable of containing the particles resulting from such shattering. While it is to be understood that the instant invention is applicable widely with regard to coating of articles, the following discussion of the prior art will be directed primarily to coating of glassware in view of the more demanding requirements involved in coating glassware.

United States Letters Patents 2,981,639 and 3,060,057 disclose the coating of articles by dipping a preheated article into a plastisol solution. Plastisols, of course, are mixtures of polymers and plasticizers and not, for functional purposes, mixtures of polymers and solvents. In almost every case, a plastisol mixture is quite viscous thereby making it difficult to accurately control overall coating thickness, to maintain homogeneous coating thickness and to avoid sagging of the coating. Plastisols are particularly inappropriate for thin coatings and, accordingly, as a result of the rather large amounts of material necessarily utilized, are not economical.

United States Letters Patent 3,200,002 is an example of dip coating wherein a heated article is immersed in a molten plastic solution. Again, molten plastics are normally highly viscous and subject to degradation if locally heated to a high temperature by the heated article. This relationship also produces a thermal shock between the relatively hot article and the relatively cooled molten plastic. High viscosity impedes movement of articles through the molten bath in production situations and causes waves to form when articles move through static baths.

United States Letters Patent 2,812,269 contains an excellent discussion of dip coating of heated articles in a bath of solvent and polymer. This approach has the added advantage of utilizing a solvent to produce a bath of relatively low viscosity which permits rather careful control of coating thickness and further permits the accomplishments of thin coating on the article. Further, low viscosity solutions permit movement through the bath without disruption of the bath. It would be fair to say that the instant invention is an improvement upon the coating method disclosed in United States Letters Patent 2,812,269 and, in many basic respects, utilizes process steps otherwise quite similar to those of the patent.

SUMMARY OF THE INVENTION

The present invention, which provides a heretofore unavailable improvement over previous dip coating methods, utilizes dip time and article preheat temperature parameters to produce the desired thin coatings of polymers. Contrary to the teachings of the prior art, the article is heated to a temperature of at least about 30° F. higher than the boiling temperature of polymer and solvent bath solution in order to induce a more intense boiling when the article is immersed in the bath. Such an approach, as will be discussed and demonstrated in more detail below, produces an even, thin coating of readily controlled weight in a convenient short dipping step.

Accordingly, an object of the present invention is to provide a new and improved method for rapidly coating articles with a polymer from a polymer-solvent bath.

Another object of the present invention is to provide a new and improved article coating method useful with large numbers of polymer compositions, including inexpensive polymer compositions.

Yet another object of the present invention is to provide a new and improved method for coating articles with polymer coatings of thin film characteristics.

Yet another object of the present invention is to provide a new and improved method for providing polymer coatings of constant thickness on articles.

Still another object of the present invention is to provide a new and improved method of providing sag-free and run-free coatings of polymers on articles.

Still another object of the present invention is to provide a new and improved method which is substantially independent of viscosity for coating thickness or weight for producing polymer coatings on articles.

A further object of the present invention is to provide a new and improved method for producing polymer coatings on glassware wherein the glassware may be promptly and conveniently coated in the course of conventional production of glassware.

These and other features of the present invention will become apparent from the following descriptions.

BRIEF DESCRIPTION OF THE DRAWINGS

In the drawings:

FIGS. 1, 2, 3 and 4 are graphical representations of the results of the instant invention in which the ordinate corresponds to coating weight and the abscissa corresponds to preheat temperatures of an article dipped in a polymer solvent bath; and FIG. 5 is a simplified, partially sectioned illustration of an apparatus for dip coating articles in conjunction with the manufacture of glassware.

DETAILED DESCRIPTION OF THE INVENTION

According to the instant invention, a boiling bath of a polymer and solvent for the polymer is utilized to produce a coating of the polymer on an article dipped into the bath. For purposes of illustration, the discussion will be directed to glassware articles, but it will be understood that the method is broadened applicable to other articles.

Conventional dip coating teaching indicates that the article to be coated should be either below the temperature of the polymer-solvent bath and allowed to become heated to the bath temperature during immersion or, as taught in United States Letters Patent 2,812,269, the article should be at or slightly above the bath temperature to avoid condensation of solvent vapors above the bath on the article as the article passes through the vapors into the bath. Such condensation is taught to cause uneven or poor coating of the article.

In counter distinction to the conventional methods, the instant invention involves preheating of the articles to a temperature substantially above that of the polymer-solvent bath prior to immersion in the bath. By preheating the article substantially above the temperature of the polymer-solvent bath, and particularly when the polymer-solvent bath is in a boiling condition, immersion of the article induces localized boiling in the bath with localized vaporization of the solvent and resulting deposition of the polymer onto the article. Since, in a boiling polymer-solvent bath, the heat transferred from the preheated article into the bath induces more intense boiling, the kinetics of the coating process are substantially enhanced. Further, the localized boiling induces turbulence and agitation in the bath thereby avoiding concentration gradients and, accordingly, greatly favoring a smooth, even coating. Coating thicknesses substantially higher than those accomplished previously are attainable as a result of the localized boiling of the bath induced by the article. In fact, as will be shown below, when the article is cooled to the bath temperature, the coating actually redissolves from the article back into the bath.

Coating of the article is "driven" by the heat transferred from the article to the bath. Accordingly, the amount and rate of coating is a function of the specific heat and mass of the articles to be coated. Articles must, of course, be chemically inert to the polymer-solvent bath and have a heat conductive nature. Those skilled in the art will readily recognize the numerous metallic, vitreous, mineral and other articles to which the method is applicable. In the case of glassware, it has been found that a temperature of 30° F. or higher above the temperature of the boiling polymer-solvent bath is operable, though those skilled in the art will readily recognize the minimum perfect temperature for a given bath and article since the results attributable to the instant invention constitute a discontinuity when compared to those of the prior art.

Polymers and solvents useful in the method are numerous. Since the method is, in essence, an improvement of previously known and widely practiced technology, such as that discussed in United States Letters Patent 2,812,269, those skilled in the art are readily and fully familiar with the nature of these constituents. However, it is desirable that the solvent have a relatively low boiling point thereby permitting condensation of the vapors by apparatus such as a vapor degreaser. Condensation of the solvent and operation of the method will be enhanced if the solvent has a relatively low heat of vaporization. This will permit relatively large amounts of solvent to be "boiled away" by the heated article with a minimal amount of heat.

The method of the instant invention will be more readily understood and appreciated with reference to the following Examples.

EXAMPLE I 1,680 grams of polyvinyl chloride was dissolved in a solution of 14 liters of tetrahydrofuran and 622 grams dioctylphthalate with a small amount of antifoamant to form a slightly less than 12% solution of polyvinyl chloride. The solution was heated to a boiling condition (about 155° F.) and stirred. A series of glass ignition tubes, 25 millimeters by 200 millimeters, were each heated for 3 hours at temperatures of 155° F., 170° F., 185° F., 200° F., 212° F., and 230° F., mechanically lowered into the boiling polyvinyl chloride-tetrahydrofuran solution and, 20 seconds after all visible boiling ceased, removed at a rate of 1 foot per second. Five tubes were coated at each temperature (which was actually somewhat lower than the preheat as a result of limited heat loss during transfer from the preheating oven to the bath) and, after air drying for at least 1 hour, a strip of coating three inches wide was removed circumferentially from each tube. The coating was a plasticized polyvinyl chloride composition of about the same ratio of the dioctylphthalate to polyvinyl chloride in the solution. The average weights at each preheat temperature of the coating removed is shown below in the Table and illustrated in FIG. 1.

EXAMPLE II

A procedure identical to that of Example I was carried out with the exception that the heated tubes were immersed in the boiling polyvinyl chloride-tetrahydrofuran bath for a period of 90 seconds. The average weights at each preheat temperature of the coating removed is shown below in the Table and illustrated in FIG. 2.

EXAMPLE III

A procedure such as that described in Example I was carried out with the exception that the polyvinyl chloride-tetrahydrofuran bath was 10% by weight of polyvinyl chloride, the withdrawal rate was 2 feet per minute and the immersion time was till cease of boiling plus 10 seconds. The average weights at each preheat temperature of the coating removed is shown below in the Table and illustated in FIG. 3.

EXAMPLE IV

A procedure as described in Example III was carried out with the exception that the immersion time was 180 seconds. The average weights at each preheat temperature of the coating removed is shown below in the Table and illustrated in FIG. 4.

TABLE

| Preheat Temperature F.° | Average Weights in Grams | | | |
|---|---|---|---|---|
| | Example I | Example II | Example III | Example IV |
| 155 | .1183 | .1179 | --- | --- |
| 160 | --- | --- | .0860 | .0870 |
| 170 | .1030 | .1062 | --- | --- |
| 180 | --- | --- | .0909 | .0787 |
| 185 | .1100 | .1112 | --- | --- |
| 200 | .2591 | .1397 | .3391 | .0910 |
| 215 | .3518 | .2199 | --- | --- |
| 220 | --- | --- | .4252 | .1686 |
| 230 | .4106 | .3764 | --- | --- |
| 240 | --- | --- | .4054 | .2209 |
| 260 | --- | --- | .4439 | .3432 |
| 280 | --- | --- | .4254 | .4268 |

From the above, and particularly Examples I and III, it will be seen that the coating weight is increased by several hundred percent at the higher preheat temperatures, and that the discontinuity and the temperatures versus weight occurs, with regard to the specifics of the example materials, about 30° above the boiling temperature of the polymer-solvent bath, though this can vary for differing baths and articles. Further, the longer immersion time is clearly counterproductive in that coating weight is appreciably lower for the 90 and 180 seconds immersion times of Examples II and IV. This is in accord with the precepts of the instant invention in that, after temperature equilibrium between the bath and the article is reached, the coating material tends to redissolve from the article into the bath. Obviously, the ultimate equilibrium coating weight is that of the boiling temperature of the bath and the weight from which redissolution initiates is at or perhaps somewhat above the weight indicated in Examples I and III. At higher preheat temperatures the equilibrium, or termination of boiling plus 10 or 20 seconds, approaches an immersion time of 180 or 90 seconds. Accordingly, the amounts of coating deposited in Examples II and IV approach those deposited in Examples I and III.

The composition of the Examples is similar to that obtained from a plastisol mixture of only the plasticizer and polymer. However, the mechanism of coating differs. Coatings of polymers sans the plasticizer can be formed in a similar manner.

A preferred embodiment of the instant invention is illustrated in schematic form in FIG. 5. This embodiment relates to the production of glassware. Glassware is formed in molds from molten glass and, when removed from the molds and placed on a conveyor, is at a temperature above 1,000° F. Newly formed glassware usually consists of molten glass in the interior of the container supported by a less flowable surface of cooler glass. As a result of the nature of the glass and the temperatures involved, it is necessary to slowly and evenly cool the glassware to a much lower temperature thereby avoiding distructive stress in the glassware. For this reason, the glassware, shortly after being formed, is conveyed to an annealing lehr having progressively lower temperature stages. Upon exit from the annealing lehr, the glassware is at a temperature generally above that necessary for the coating of the instant invention, but sufficiently low as to be stable upon exposure to ambient temperatures.

As shown in FIG. 5, glassware 11 is supported on lehr belt 12 upon exit from the annealing lehr (not shown). A conveyor 13 has mounted thereon support links 14 and, on the end of support links 14, bottle engaging means 15 grasp and support glassware 11. Thus, glassware 11 is carried by conveyor 13 up and away from conveyor belt 12. While not intended to be illustrated in detail, it might be noted that support links 14 are offset from conveyors 13 in order that support links 14 and supported glassware 11 may clear conveyor supports 17. Tank 19 contains bath 20 of a polymer and solvent according to the instant invention. Heating coils 22 are provided to maintain bath 20 in a boiling condition. Preferably, cooling coils 23 are disposed above bath 20 to condense vapors from bath 20 and prevent or minimize escape of solvent from bath 20. Glassware 11, heated to a temperature substantially above that of the boiling temperature of bath 20 as a result of the production and annealing process, is transported into, through and out of bath 20. It should be noted that no additional preheating or other energy is required in that the heat is inherently present in glassware 11 from the production process. After removal from bath 20, coated glassware 25 is conveyed on conveyor 13 and deposited on line conveyor 26 for further processing in accordance with usual practice. Thus, glassware 11 may be simply, rapidly and easily coated as an integral portion of glassware 11 manufacturing process and without a necessity of heating glassware 11.

Though the above Examples and discussions are particularly concerned with the amount of coating which can be deposited upon an article, it must be understood that this discussion inherently involves the rate of coating and the quality of the resulting coating. The heat transferred from the article to the bath is, in large part, a function of the temperature differential and, accordingly, hotter articles may be more quickly coated. The unevenness of coating is usually a result of the termination of coating in one area of the article while coating continues in another area. By removing the articles from the bath before the articles come to the temperature of the bath, even coating is produced since the articles, in all areas, are at essentially identical preheated temperature. Further, by removing the article from the bath before cooling to the bath temperature, the coating is quickly set and sagging or running is prevented. The article itself, being still at a temperature above that of the bath, quickly drives off whatever excess solvent remains in the polymer coating.

Though the method of the instant invention has been illustrated with regard to specific examples and figures, it is, of course, to be understood that applicability of the invention is broader and to be limited only by the following claims.

What is claimed is:

1. A method for forming controlled and even polymer coatings on articles, comprising: forming a bath of the polymer comprising polyvinyl chloride and a solvent comprising tetrahydrofuran for the polymer, heating the bath to the boiling temperature of the bath, heating the article to a temperature of at least 30° F., above the bath temperature, at least partially immersing the article in the bath to cause more intense boiling of the bath adjacent the article, depositing the polymer during said intense boiling from the bath to the article to form an even, smooth coating on the article, and removing the article from the bath before the article comes to the temperature of the bath.

2. A method as set forth in claim 1 wherein the article is removed from the bath while the article is at a temperature above the bath temperature but below the temperature of the article when immersed.

* * * * *